US010162689B2

(12) United States Patent
de Lima et al.

(10) Patent No.: US 10,162,689 B2
(45) Date of Patent: *Dec. 25, 2018

(54) ADAPTIVE VOLUME CONTROL

(71) Applicant: Chicago Mercantile Exchange Inc., Chicago, IL (US)

(72) Inventors: Jochen Mielke de Lima, São Paulo (BR); Ari Studnitzer, Chicago, IL (US); Frank Kmiec, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 141 days.

This patent is subject to a terminal disclaimer.

(21) Appl. No.: 15/207,152

(22) Filed: Jul. 11, 2016

(65) Prior Publication Data
US 2016/0321119 A1  Nov. 3, 2016

Related U.S. Application Data

(63) Continuation of application No. 14/372,540, filed as application No. PCT/US2013/021680 on Jan. 16, 2013, now Pat. No. 9,417,936.

(60) Provisional application No. 61/588,744, filed on Jan. 20, 2012.

(51) Int. Cl.
G06F 9/54 (2006.01)
G06Q 40/04 (2012.01)

(52) U.S. Cl.
CPC ............ G06F 9/546 (2013.01); G06Q 40/04 (2013.01)

(58) Field of Classification Search
None
See application file for complete search history.

(56) References Cited

U.S. PATENT DOCUMENTS

| | | |
|---|---|---|
| 5,530,848 A | 6/1996 | Gilbert et al. |
| 5,916,307 A | 6/1999 | Piskiel et al. |
| 6,707,792 B1 | 3/2004 | Volftsun et al. |

(Continued)

OTHER PUBLICATIONS

Extended European Search Report, from European Application No. 13738831.0, dated Feb. 27, 2015, EP.

(Continued)

Primary Examiner — Tuan C Dao
(74) Attorney, Agent, or Firm — Lempia Summerfield Katz LLC

(57) ABSTRACT

The disclosed embodiments relate to regulation of receipt, rate or volume, and processing of messages, such as order, mass quote or other trade related messages by available trading system resources to minimize congestion, maximize efficient use, minimize unfair monopolization and ensure fair access to/allocation thereof. The disclosed embodiments may act as a governor limiting the maximum rate of message submission to the rate at which the submitted messages can be processed. In particular, the number of concurrent, i.e. received/accepted but not yet completed/processed/responded to, messages may be limited. As long as the limit is not exceeded, i.e. the rate of completion/processing meets or exceeds the receipt rate, no interruption may be imposed. However, once the limit is reached, subsequently received messages may be buffered or otherwise dropped. In this way, the limit may define the extent to which incoming messages may consume the concurrent processing capacity, or allocated portion thereof.

37 Claims, 4 Drawing Sheets

(56) References Cited

U.S. PATENT DOCUMENTS

| | | | |
|---|---|---|---|
| 7,899,738 | B2 | 3/2011 | Patel et al. |
| 2007/0112918 | A1* | 5/2007 | Berstis .................. G06Q 10/107 709/206 |
| 2007/0147238 | A1 | 6/2007 | Kadambi et al. |
| 2007/0276901 | A1 | 11/2007 | Glinsky et al. |
| 2009/0024998 | A1 | 1/2009 | Hughes et al. |
| 2009/0076940 | A1 | 3/2009 | Patel et al. |
| 2010/0036940 | A1 | 2/2010 | Carey et al. |
| 2010/0149973 | A1 | 6/2010 | Krupp et al. |
| 2010/0180045 | A1* | 7/2010 | Weinstock ............ H04L 47/745 709/232 |
| 2010/0217837 | A1 | 8/2010 | Ansari et al. |
| 2011/0071988 | A1* | 3/2011 | Resch .................. G06F 11/1076 707/691 |
| 2011/0106858 | A1 | 5/2011 | Rieger |
| 2011/0258100 | A1 | 10/2011 | Krishna et al. |
| 2012/0011203 | A1 | 1/2012 | Itoh |
| 2012/0289191 | A1 | 11/2012 | Puura |
| 2013/0066977 | A1 | 3/2013 | Katti et al. |

OTHER PUBLICATIONS

International Preliminary Report on Patentability, from PCT/US2013/021680, dated Jul. 31, 2014, WO.

International Search Report and Written Opinion, from PCT/US2013/021680, dated Mar. 22, 2013, WO.

Iazowska, Edward, "An Overview of Queueing Network Modeling", Quantitative System performance, Computer System Naalysis Using Queueing Network Model, Chapter 1, pp. 2-13, 1984.

Limit on Concurrent Peged-toStock and Volatility Orders Exceeded, Interactive brokers, retrieved Jan. 13, 2012, hppt://ibkb.interactivebrokers.com/node/1301, 2 pages.

Wikipedia, "Leaky Bucket", http://wikipedia.org/Leaky Bucket, retreived Jan. 13, 2012, 12 pages.

Wikipedia, "Rate Limiting", http://wikipedia.org/wikie/rate limiting, retrieved Jan. 13, 2012, 2 pages.

Wikipedia, "Token Bucket", http://wikipedia.org/Token bucket, retreived Jan. 13, 2012.

\* cited by examiner

ADAPTIVE VOLUME CONTROL

REFERENCE TO RELATED APPLICATIONS

This application is a continuation under 37 C.F.R. § 1.53(b) of U.S. Pat. application Ser. No. 14/372,540 filed Jul. 16, 2014 now U.S. Pat. No. 9,417,936, which is a National Stage Entry of PCT Application PCT/US2013/21680, filed on Jan. 16, 2013, which claims the benefit of the filing date of U.S. Provisional Application Ser. No. 61/588,744 filed Jan. 20, 2012, all of which are hereby incorporated by reference in its entirety.

BACKGROUND

A financial instrument trading system, such as a futures exchange, referred to herein also as an "Exchange", such as the Chicago Mercantile Exchange Inc. (CME), provides a contract market where financial instruments, for example futures and options on futures, are traded. Futures is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash Settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price.

Typically, the Exchange provides for a centralized "clearing house" through which all trades made must be confirmed, matched, and settled each day until offset or delivered. The clearing house is an adjunct to the Exchange, and may be an operating division of the Exchange, which is responsible for settling trading accounts, clearing trades, collecting and maintaining performance bond funds, regulating delivery, and reporting trading data. The essential role of the clearing house is to mitigate credit risk. Clearing is the procedure through which the Clearing House becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the Clearing House.

Current financial instrument trading systems allow traders to combine orders for a group of financial instruments into a single message called a mass quote message. For example, a trader or trading entity may use a mass quote message when transmitting multiple orders for a group of related option contracts, such as an option series belonging to one option class. With conventional trade engines, each individual order, whether for an individual order or mass quote, for example, is processed and results in the creation of market data. The market data, e.g. confirmation messages, updated price information, etc., produced for each trade is then distributed to traders and other entities as, for example, market data messages.

As more traders utilize and increasing number of mass quote messages, the distribution of market data messages resulting therefrom consumes limited resources and can strain processing and communications resources that are used to generate and transmit such messages.

DETAILED DESCRIPTION

Figure 1:
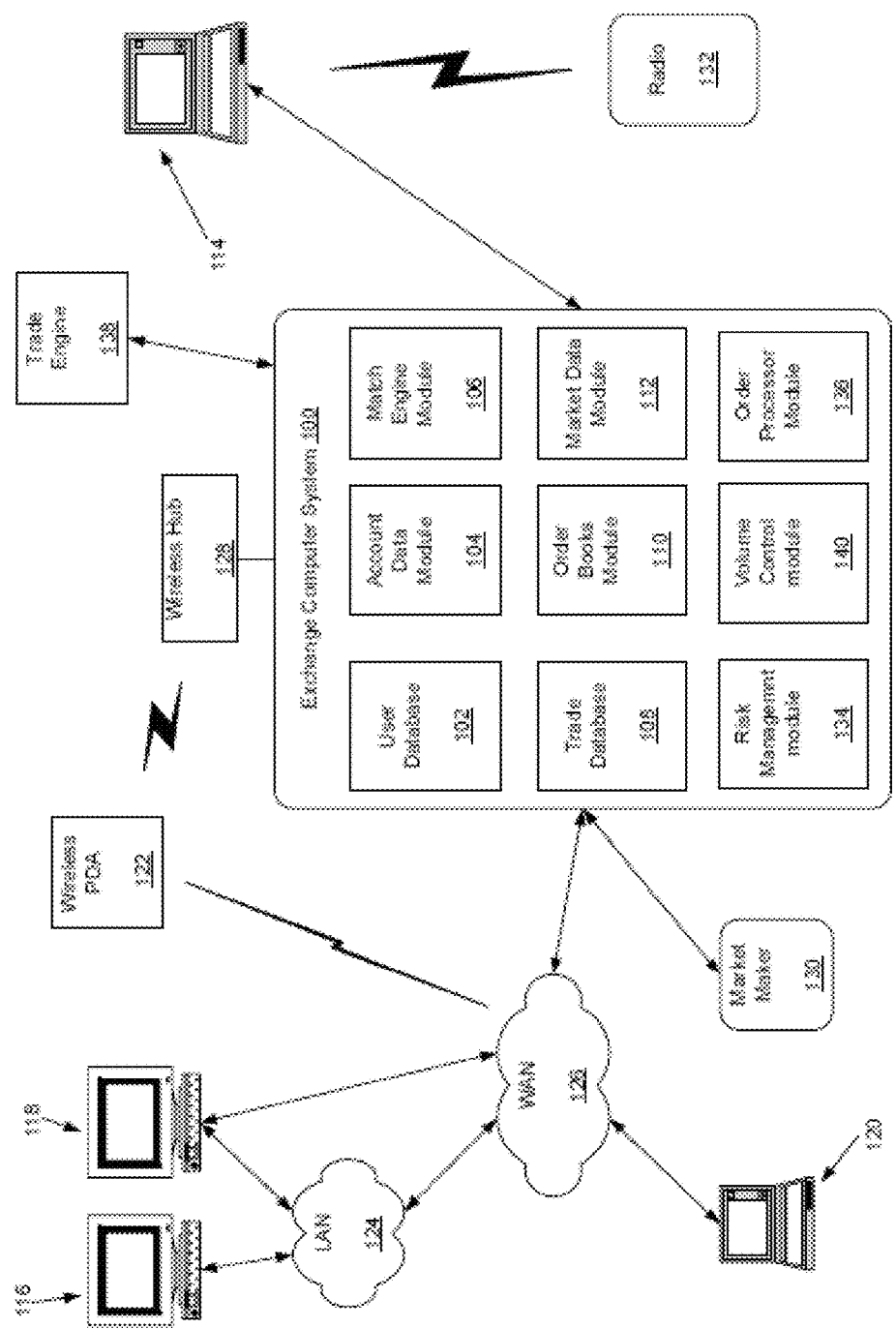
FIG. 1 depicts an illustrative computer network system that may be used to implement aspects of the present invention FIG. 2 a block diagram of an exemplary implementation of the system of FIG. 1 for administering futures contracts, according to one embodiment.

The disclosed embodiments relate to regulation of receipt, rate or volume thereof, and processing of inbound messages, such as order entry messages, cancel messages, mass quote messages or other order or trade related communications communicated from market participants to the exchange, e.g. cancellation messages, by available trading system resources so as to minimize congestion, maximize efficient use, minimize unfair monopolization and ensure fair access to/allocation thereof. Generally, the disclosed embodiments may act as a governor, or otherwise create "back-pressure," limiting the maximum rate of message submission, or otherwise in-bound messages, to the rate at which the submitted messages can be processed. In particular, the disclosed embodiments limit the number of concurrent, i.e. received/accepted but not yet completed/processed/responded to, messages. As long as the limit, also referred to as a cap or threshold, is not exceeded, i.e. the rate of completion/processing meets or exceeds the rate of receipt, no interruption in flow may be imposed. However, once the limit is reached, subsequently received messages may be buffered or queued, rejected or otherwise dropped. In this way, the limit may define the extent to which incoming messages can consume the concurrent processing capacity, or allocated portion thereof, or otherwise exceed, precede or otherwise anticipate the response rate. The limit may be static or dynamic and may be defined based on factors such as available processing capacity, latency, bandwidth, queue length or other related or unrelated factors. A singular static or dynamic limit may be globally applied for all inputs to the trading system. Alternatively, static or dynamic limits may be applied per session, per gateway, per user, per customer, per message type, per trading engine, or other logical or exchange based grouping, etc. alone, in combination and/or in conjunction with a global limit. It will be appreciated that a hierarchy of limits applied to subsets of sessions, gateways, users, customers, message types, etc., may be implemented and further that the disclosed embodiments may be implemented in conjunction with other volume control mechanisms, such as rate limiting mechanisms which impose limits on the quantities of message transmitted to and/or received by the trading system as a function of time.

Other solutions to managing message volume include systems and methods for controlling the rate of acceptance of messages. In one example, a method is disclosed for determining if the consumption value of mass quote messages and/or quotes exceeds predetermined thresholds during a predetermined interval of time. If the threshold is met or exceeded, then messages that fall within a subsequent predetermined window, such as messages received with a defined time period, may be rejected. An indication of non-compliance (e.g., a rejection message such as defined in the Financial Information eXchange FIX Protocol) with the threshold setting may be sent if a violation is detected. Meanwhile, if the threshold settings are not found to be violated, then messages may be accepted for processing. A message counter and/or a quote counter may be used to monitor the quantity of each message received during an interval of time. The counters may be reset when a message is received outside the predetermined window. As such the consumption value may be calculated using various techniques. Furthermore, a trading terminal may send mass quote messages to an exchange or other system for processing. The trading terminal may receive an indication that a threshold has not been complied with, and thus, is in non-compliance. Moreover, a system may include a lockout variable configured to indicate whether incoming messages should be rejected or accepted for processing. The system may also include a quote counter and mass quote counter. New quotes and mass quote messages may be received at an order receiving module at an exchange or other system. Meanwhile, a window determination module, consumption calculation module, and compliance verification module may be included in such a system to perform one or more features of the system.

The above described solutions, which limit the rate at which messages may be submitted, may suffer from a lack of flexibility to selectively regulate inbound message traffic (orders, cancels, modifies, or mass quotes) across sessions, across gateways and/or globally, such as in the case when large numbers of traders are reacting to a market wide event. Regulation of only intra-session mass quote message traffic further may allow users to circumvent such regulation by spreading their message traffic in compliant levels over multiple sessions, multiple gateways, etc. In addition, the solution described above utilizes a static limit on the message transmission rate which limits the ability to adjust, such as in real time, to changes in conditions, such as changes in market conditions which may trigger an increase in traffic. Further, the solutions described above may be reactive in that they may measure a rate of message flow and then, based thereon, apply a restriction on subsequent message traffic. Accordingly, a burst of traffic may impact subsequent compliant traffic.

The disclosed embodiments may be used to limit the rate at which customers can submit messages, such as orders, order modifications, mass quotes or order cancellations submitted to an electronic trade matching engine associated with a financial exchange. As discussed above, a large number of inbound messages may impact the operating efficiency of the trading engines and/or the engines' responsiveness. The disclosed embodiments may be used to ease bandwidth and processing constraints on trading engines and other exchange infrastructure/systems allowing, for example, an exchange to provide a more stable and reliable market or otherwise provide for more equitable access thereto by market participants. It will be appreciated that the disclosed embodiments may be deployed in conjunction with upgrades to other infrastructure, such as order entry and/or market data distribution systems, for example the iLink and market data platform (MDP) systems offered by the Chicago Mercantile Exchange Inc., to further enhance the system.

Generally, the disclosed embodiments implement a cap on the number of concurrent, or "in flight," messages which may be at least accepted for processing, in parallel or otherwise, at any given time. Once this limit/cap is reached, subsequently received messages may be buffered or otherwise queued and/or rejected, dropped or deleted, depending upon the implementation, until such time as processing of one or more of the accepted messages is completed. As was described above, the cap or limit on the number of concurrent messages, and/or the queue depth or delay, may be static or dynamic and may be imposed per session, per gateway, per user, per trader, per message type, per trading engine, globally, or as a function of some other logical client and/or exchange-based grouping or combination thereof. Cap(s) or limit(s) may further be defined based on message type, e.g. cancellation messages, order placement messages, allowing, for example, for relaxed limits on those types that have a lower processing cost for the system or otherwise improve, rather than degrade, system performance. The cap(s) or limit(s) values may be defined based on processing capacity of the trading system, or portion thereof, e.g. database, clearing function, or trading engine capacity, communication bandwidth, etc. Alternatively, or in additional thereto, the cap(s) or limit(s) may be defined based on unrelated factors such as historic trading volume, market regulations, etc. It will be appreciated that trading entities may be charged fees for access to the trading system and that the limit(s) may be defined based on the fees charged, e.g. a higher limit for a higher fee.

Where a limit, queue depth or queue delay is dynamically defined, it may be varied manually by the operator of the trading system, or automatically, based on, or as a function of, current system load or performance, or the current performance of a component thereof, bandwidth utilization, latency, etc. In one embodiment, a particular limit may be varied in real time and may be varied to account for surges or spikes in message traffic. Further, a limit may be varied based on a change in performance of the system, or component thereof, change in utilization, etc. For example, the system may act preemptively, e.g. a limit may be lowered if it is determined that the current system load is approaching, but not yet at, the maximum load of the trading system. Further, based on historical performance, enforcement of a limit may be temporarily relaxed, allowing for additional processing capacity. It will be appreciated that aspects of statistical process control may be implemented to measure system performance, or performance of a component thereof, and adjust one or more concurrent processing limits, as defined herein, in a cyclical, continuous or semi-continuous manner, to maintain system performance within defined tolerances. Further, hysteresis based functionality may be implemented which analyze historical transactional activities, message traffic, system, or portion thereof load, etc. to dynamically adjust limits, queue depth, queue delay, etc. in anticipation of increased or decreased demand, whether persistent or transient. For example, a rate-dependent hysteresis function may be implemented to account for lag in the response of the trading system, or other transient response, to previously received messages, as well as the market's, i.e. the market participants', reaction, e.g. such as to a change in price, etc. Further rate-independent hysteresis functions may be implemented, alone or in conjunction with rate-dependent functions, to account for persistent changes, or other non-transient responses, in the trading system state.

As will be appreciated, once a limit is reached, the maximum rate at which messages may be submitted for processing will be limited to the response rate, i.e. the rate at which processing of messages is completed. As long as the rate of message submission remains under the limit, i.e. less than the rate at which the trading system completes processing, the rate of message submission will remain unimpeded. This response rate may be the actual response rate of the system operating at maximum throughput or may be artificially limited by the operators of the trading system to effect a resultant restriction on message submission. In this way, for example, operators of a trading system may exert greater control over message traffic. Further, by imposing inter-session, inter-gateway, inter-user or otherwise global limits, or combinations thereof, the ability of any one entity to circumvent the limits may be reduced. By imposing per-message type, per trading system component, e.g. per trading engine, per interface, etc. limits, excessive or otherwise unbalanced processing loads may be mitigated or otherwise reduced. It will be appreciated that mechanisms may be implemented to increase limits or otherwise relax limit enforcement when available processing capacity exists to accept the additional messages.

It will be appreciated that a trading environment, such as a futures exchange as described herein, implements one or more economic markets where rights and obligations may be traded. As such, a trading environment may be characterized by need to maintain market integrity, transparency, predictability, fair/equitable access and participant expectations with respect thereto. For example, an exchange must respond to inputs, such as trader orders, cancellation, etc., in a manner as expected by the market participants, such as based on market data, e.g. prices, available counter-orders, etc., to provide an expected level of certainty that transactions will occur in a consistent and predictable manner and without unknown or unascertainable risks. In addition, it will be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participant are met, e.g. that transactional integrity and predictable system responses are maintained.

Generally, the disclosed embodiments may be implemented using a counter for each limit to be imposed. It will be appreciated that, depending upon the implementation, the counter(s) may be initialized to zero or to the limit value. Where a counter is initialized to zero, each message which is accepted for processing or for which processing is otherwise commenced, causes the counter to be incremented. Prior to acceptance, or subsequent thereto, depending upon the implementation, the counter value is tested to see if it is at the limit. If tested prior to message acceptance, the pending message may be buffered or queued or otherwise rejected or deleted or result in a logout of the connection or session or other communication interruption as will be described. In an implementation where the counter is tested subsequent to acceptance, subsequently received messages may be buffered, queued, rejected or deleted if the counter value is at the limit. In implementations where the counter is initialized to the limit value, message acceptance may cause the counter to be decremented. In this case, the counter may be tested, similarly as described above to see if it has reached zero to determine if the limit has been reached. When processing of a message is completed, the counter is decremented or incremented, depending upon the implementation, to reflect the availability of processing capacity. Completion may be indicated by the generation of a response or other message or by some other indicator or signal depending upon the implementation.

As will be described below, logic may be implemented, such as within a communications gateway, interface, channel, port, or other medium through which messages flow, to detect the arrival of a message and/or the acceptance of the message for processing, whereby the logic adjusts the counter, as described above, to account therefore, or otherwise queues or rejects the message, as described. Similarly, in an implementation whereby response messages or other indicators of the completion of processing flow through the same communications gateway, interface, channel, port, or other medium, the logic similarly can adjust the counter, as described above, to account for the completion. In implementations whereby the transmission of inbound messages occurs via a different communications gateway, interface, channel, port, or other medium than that used to convey the response messages or other completion indicators, logic may be provided which detects processing completion and generates a suitable signal which is communicated to cause the appropriate adjustment to the counter.

It will be appreciated that the communications to, from and among the trading system and the market participants therein, may include various types of messages and that not all messages may be counted towards the limits described herein or that different limits may be imposed as was described above. Further, where messages generate various types of responses, such as different types of response messages, not all such responses may be considered to indicate completion of processing and alleviation of a particular limit. It will be appreciated that the messages which count towards and against the limit(s) described here are implementation dependent.

In one embodiment, one a particular limit is reached, received messages are queued in a buffer, queue or other storage until processing of one or more previously accepted messages is completed. In one embodiment, this buffer has a limited storage capacity and when full, causes subsequently received messages to be rejected or deleted. It will be appreciated that, when one or more messages have completed processing, messages in the buffer are processed prior to subsequently received messages. This may be accomplished, for example, by forcing all messages to flow through the buffer. Alternatively, newly received messages may be processed before buffered messages or the system may alternate between processing buffered messages and newly received messages as processing of previously accepted messages completes.

In one embodiment, as the processing limit is approached, warning messages or other indicators may be generated to alert the trader or other entity subject to the limit that they are approaching it.

In one embodiment, intermediate thresholds, referred to as "watermarks," may be implemented. Upon reaching the limit, which may be referred to as the "high watermark," as defined above, messages may be queued and/or dropped as was described. However, as opposed to immediately re-enabling message acceptance upon completion of processing of a previously accepted message, the number of concurrently processing messages may be required to drop below an intermediate limit, referred to as a "low watermark," before acceptance is re-enabled. This may prevent thrashing or jitter wherein a given user, trader, session, etc. constantly remains at their limit, vacillating between message acceptance and rejection/queuing states. In implementations where response messages are transmitted indicating when the limit is reached or exceeded, watermark limits may reduce the volume of such response messages thereby further reducing message congestion.

In order to maintain trader expectations, a trader may be permitted to specify, such as via a parameter of their message, whether the message should be queued or outright rejected when the limit has been met. In some cases, a trader may need to know immediately when a transaction has been accepted for processing as any delay may upset a trading strategy implemented thereby or of which the message, or transaction therein, is a part. In one embodiment, whether to queue or rejected over-limit messages may be generally specified by a trader for all messages, a portion of messages or on a message by message basis. In one embodiment, where a trader is implementing a trading strategy which depends upon the timely processing of multiple transactions, the trader may specify, such as via a parameter of each message, that the messages are linked, related or otherwise dependent upon each other such that, if all of the messages cannot be accepted for processing at the same time, all should be queued or rejected. Alternatively, or in addition thereto, a trader may be permitted to specify, such as via a parameter of a message, how long the message may stay in the queue waiting to be accepted before the message should be rejected. As such, a trader may define those transactions for which timely processing is required but immediate processing is not. It will be appreciated that the trading system operator may also specify whether all or some messages may be queued, and for how long, or outright rejected when a particular limit is reach, instead of or in addition to the trader, on a trader by trader and/or global basis. Alternatively, or in addition thereto, a trader and/or the system operator may specify the queue depth so as to manage the number of messages which may be queued awaiting available processing capacity. In one embodiment, queue depth may be dynamic and vary depending upon system load, and other factors as described with respect to dynamic limits on concurrent processing.

As was discussed above, the trading system may implement a hierarchy of processing limits across sessions, gateways, message types, trading system components, globally, etc. For example, in a system which buffers message traffic in excess of a given limit, a first limit may set for the particular session and a second global limit across all sessions may be imposed. If the message traffic within the session exceeds the first limit or the aggregate message traffic across all sessions exceeds the second global limit, subsequently received messages will be buffered. This allows for more selective control over utilization.

In one embodiment, where limits are imposed on a per session, per user basis or otherwise, the trading system may permit a user with excess capacity to give, trade or sell their excess capacity to another user or entity. In an alternate embodiment, the trading system may dynamically adjust or otherwise balance limits across sessions, users, gateways, etc. to compensate for changes in processing or communication capacity or to otherwise maintain system performance, e.g. latency, throughput or response rates, within defined parameters, such as a during extreme market events which may cause temporary increases, spike or surges in message traffic. As mentioned above, the trading system may charge a fee for capacity or for additional capacity over an above an initial allotment, such as a per transaction overage fee for exceeding a limit, a subscription fee for available and/or additional capacity, a congestion fee for exceeding a limit during high volume intervals, etc. Alternatively, or in addition thereto, limits, or reductions thereof, may be imposed as a penalty for violation of exchange rules, regulations, etc., abuse of system resources, etc. Similarly, limits may be increased or removed to reward compliance with rules or regulations or to recognize desirable behavior.

As will be described below, the disclosed volume control mechanism may be implemented as a supervisory or monitoring module, process or processor which is part of the trading system, part of one or more gateways or as part of another one or more network devices, or combinations thereof. In particular, the disclosed embodiments may be implemented at any point(s), intermediate or otherwise, logically or physically between the entities, to which the described limits are to be applied, and the trading system computers, which process the messages, through which the relevant message traffic, as well as the responses thereto, to be monitored flows or is otherwise accessible or measurable, to the extent required by the disclosed embodiments, depending upon the implementation.

It will further be appreciated that redundant volume control mechanisms according to the disclosed embodiments may be implemented as part of an overall redundant trading system to mirror and/or otherwise replicate the described functionality for purposes of error or disaster recovery.

In accordance with aspects of the disclosure, systems and methods are disclosed for measuring the number of quotes for each session (e.g., an iLink session or other session) with mass quote messaging capabilities, across sessions, across customers or globally for the entire trading system. The disclosed embodiments are preferably implemented with computer devices and computer networks, such as those described with respect FIG. 4, that allow users, e.g. market participants, to exchange trading information. It will be appreciated that the plurality of entities utilizing the disclosed embodiments, e.g. the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange. An exemplary trading network environment for implementing trading systems and methods is shown in FIG. 1. An exchange computer system 100 receives orders and transmits market data related to orders and trades to users, such as via computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the computer 400 described below with respect to FIG. 4. A user database 102 may be provided which includes information identifying traders and other users of exchange computer system 100, such as account numbers or identifiers, user names and passwords. An account data module 104 may be provided which may process account information that may be used during trades. A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by the order book module 110 and/or match engine module 106. A volume control module 140 may be included to, among other things, control the rate of acceptance of mass quote messages in accordance with one or more aspects of the disclosed embodiments. It will be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, or other component of the exchange computer system 100.

The trading network environment shown in FIG. 1 includes exemplary computer devices 114, 116, 118, 120 and 122 which depict different exemplary methods or media by which a computer device may be coupled with the exchange computer system 100 or by which a user may communicate, e.g. send and receive, trade or other information therewith. It will be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 400 described in more detail below with respect to FIG. 4, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a Ti line, a common local area network (LAN) or other wired and/or wireless medium for connecting computer devices. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g. star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known.

As was described above, the users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may include computer-executable instructions for receiving order information from a user and transmitting that order information to exchange computer system 100. In another example, the exemplary computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Figure 2:
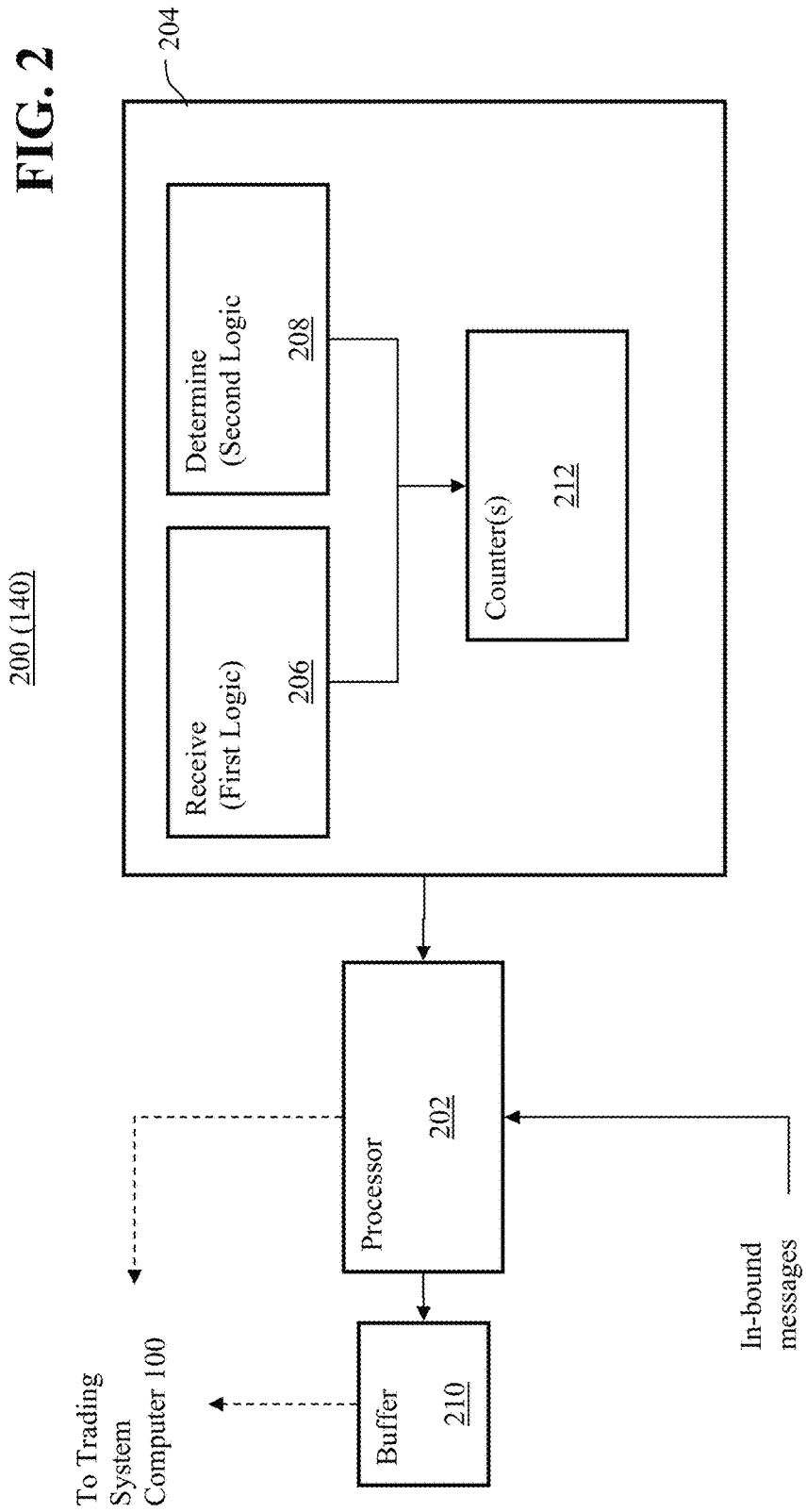

As shown in FIG. 1, the Exchange computer system 100 further includes a volume control module 140 which may implement the disclosed mechanisms as will be describe with reference to FIG. 2. However, as was discussed above, the disclosed mechanisms may be implemented at any logical and/or physical point(s) through which the relevant message traffic, and responses thereto, flows or is otherwise accessible or measurable, including one or more gateway devices, modems, the computers or terminals of one or more traders, etc.

A volume control module 140 may be included to, among other things, control the rate of acceptance of inbound messages in accordance with one or more aspects of the disclosed embodiments.

FIG. 2 depicts a block diagram of an exemplary volume control module 140 according to one embodiment, which in an exemplary implementation, is implemented as part of the exchange computer system 100 described above. The embodiments described herein utilize trade related messages such as mass quote messages, individual order messages, cancellation messages, etc. In alternative embodiments individual orders may be processed and produce market data that is compiled into a single market data message. A variety of criteria may be used to group orders that produce market data that is ultimately compiled into a single market data message. For example, orders received within a predetermined time period or orders for similar financial instruments received within a predetermined time period may be grouped together such that the resulting market data is transmitted within a single market data message. A mass quote message may contain a plurality of orders for at least one financial instrument. The mass quote message may also be associated with a session which may be defined as a connection with the exchange computer system 100. A session may be associated with a unique session identifier. The identifier may be assigned to a trading entity, such as a trader, i.e. a terminal used thereby, or a collection of traders, such a gateway device used thereby, for a trading period. The trading entity may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange 100 includes a place or system that receives and/or executes orders.

FIG. 2 shows a system 200 for managing processing of a plurality of trade related or other inbound messages, such as order messages, mass quote messages or cancellation messages, which may be implemented as a volume control module 140 as described above. It will be appreciated that the disclosed embodiments may be applicable to other types of messages depending upon the implementation. The messages may comprise one or more data packets, datagrams or other collection of data formatted, arranged configured and/or packaged in a particular one or more protocols, e.g. the FIX protocol, TCP/IP, Ethernet, etc., suitable for transmission via a network as was described.

The system 200 includes a processor 202 and a memory 204 coupled therewith which may be implemented a processor 402 and memory 404 as described below with respect to FIG. 4. The system 200 further includes first logic 206 stored in the memory 204 and executable by the processor 202 to cause the processor 202 to receive a message, of the plurality of messages, which includes a plurality of quotes for at least one financial instrument.

The system 200 further includes second logic 208 stored in the memory 204 and executable by the processor 202 to cause the processor 202 to determine, upon receipt of the message, a number of previously received messages of the plurality of messages for which processing has begun but not yet completed and further determine whether the number of previously received messages for which processing has begun but not yet completed plus the received message complies with a limit, static or dynamic, of how many messages may be concurrently processed. In one embodiment, upon reaching or approaching the maximum concurrency limit, a signal to stop or other warning or indicator may be generated. In one embodiment, the limit is stored in the memory 204 (not shown).

If it is determined that the number of previously received messages for which processing has begun but not yet completed plus the received message complies with the limit of how many messages may be concurrently processed, the second logic 208 is further operative to commence processing by the processor 202 or a different processor such as the match engine module 106, of the received message, and if it is determined that the number of previously received messages for which processing has begun but not yet completed plus the received message does not comply with the limit of how many messages may be concurrently processed, the second logic is further operative to not commence processing of the received message.

In one embodiment, the maximum rate of commencement of message processing may be limited by a rate at which message processing is completed.

In one embodiment, the plurality of messages and the limit are associated with a session, such as a session associated with a logical and/or physical connection between one or more customers or entities and the exchange computer system 100, a gateway there between, a customer or a combination thereof.

In one embodiment, the plurality of messages are received via a plurality of sessions, each of the plurality of sessions being associated with a limit of how many messages may be concurrently processed.

In one embodiment, the plurality of messages are received via a plurality of gateways, each of the plurality of gateways being associated with a limit of how many messages may be concurrently processed.

In one embodiment, the limit of how many messages may be concurrently processed is defined based on current or prior message processing capacity, i.e. an overall rate or capacity or that which is allocated/apportioned to the user, customer, session and/or gateway, internal processing capacity or load, such as database or clearing capacity or load, message processing load such as may be measured by processing latency, available bandwidth of a communications medium over which the plurality of messages are received by the processor, throughput time to complete processing of a message once commenced, rate of message receipt by the processor, historical metrics thereof and/or combinations thereof.

In one embodiment, the second logic 208 may be further executable by the processor 202 to cause the processor 202 to reject a received message for which processing is not commenced. Alternatively, or in addition thereto, the second logic 208 may be further executable by the processor 202 to cause the processor 202 store in the memory 204, or another buffer or queue 210, a received message for which processing is not commenced to be processed when it is determined that the number of previously received messages for which processing has not yet completed plus the stored received message complies with the limit of how many messages may be concurrently processed. In one embodiment, the memory 204 or buffer 210 may be characterized by a capacity, such as a number of messages, and wherein, if the memory 204 or buffer 210 is at capacity, the received message is rejected rather than stored.

In one embodiment, prior to the determination whether the number of previously received messages for which processing has begun but not yet completed plus the received message complies with a limit of how many messages may be concurrently processed, e.g. prior or subsequent to the receiving of the message depending upon the implementation, the second logic 208 may be further executable by the processor 202 to cause the processor 202 to determine whether the number of previously received messages for which processing has begun but not yet completed plus at least one of the stored received message complies with a limit of how many messages may be concurrently processed. Wherein if it is determined that the number of previously received messages for which processing has begun but not yet completed plus the at least one stored received message complies with the limit of how many messages may be concurrently processed, the second logic 208 may be further executable by the processor 202 to cause the processor 202 to remove the at least one stored received message from the memory 204 or buffer 210 and commence processing thereof. It will be appreciated that the precedence of queued messages over received messages may be implementation dependent and that, for example, queued messages, in a first in first out manner, may take precedence over newly received messages for processing in order maintain transactional/order integrity, dependency and/or coherency as was described above.

In one embodiment, the second logic 208 may be further executable by the processor 202 to cause the processor 202 to generate or otherwise assert an indicator upon completion of processing of a message. In one embodiment, the indicator may be generated or asserted upon detection, such as at a gateway or other interface, of a response message being transmitted back to the sender of the message for which processing has been completed. Alternatively, or in addition thereto, the indicator may include the response message which may be transmitted to the sender of the rejected message, an acknowledgement, confirmation or other signal or flag or merely adjustment of a counter of presently processing messages, as will be described below. Further, in one embodiment, the second logic 208 may be further executable by the processor 202 to cause the processor 202 to generate an indictor when processing of the received message is not commenced. The indicator may be a response message to the sender of the rejected message indicating that the message was buffered for later processing or otherwise rejected. As discussed above, the processor 202 may be implemented so as to be able to detect inbound messages and outbound responses, to effect the above described adjustments, whether the inbound messages and outbound responses flow through the same or different communications gateways, interface, channel, port, or other medium between the exchange computer system 100 and the exemplary computer devices 114, 116, 118, 120, 122.

In one embodiment, the second logic 292 may be further executable by the processor 202 to cause the processor 202 to adjust a counter 212, which may also be stored in the memory 204 or elsewhere, for each of the plurality of messages for which processing is commenced and for each of the plurality of messages for which processing is completed, wherein the second logic 208 is further executable by the processor 202 to cause the processor 202 to compare the counter 212 with the limit, which, as described above, may also be stored in the memory 204. In one embodiment, wherein the counter 212 is initialized to zero, the second logic 208 may be further executable by the processor 202 to cause the processor 202 to increment the counter 212 for each of the plurality of messages for which processing is commenced and decrement the counter 212 for each of the plurality of messages for which processing is completed, the second logic 208 being further executable by the processor to determine that the limit is not complied with when the counter 212, for example, equals the limit or otherwise exceeds the limit. Alternatively, wherein the counter 212 is initialized to equal the limit, the second logic 208 may be further executable by the processor 202 to cause the processor 202 to decrement the counter 212 for each of the plurality of messages for which processing is commenced and increment the counter for each of the plurality of messages for which processing is completed, the second logic 208 being further executable by the processor 202 to determine that the limit is not complied with, for example, when the counter 212 is zero or less than zero.

Figure 3:
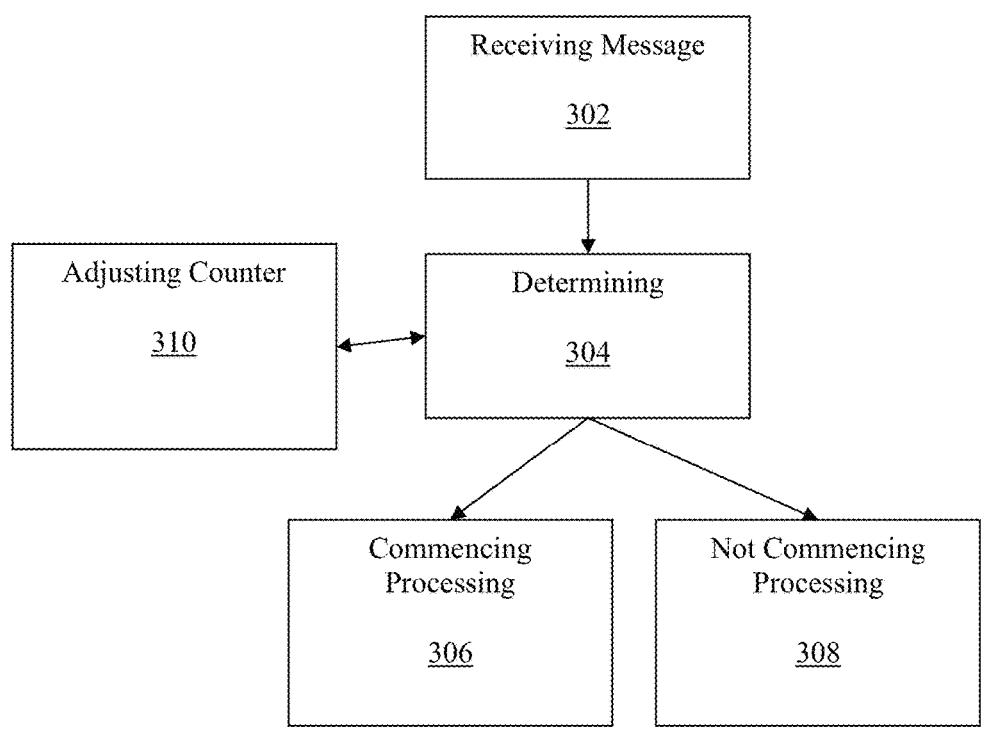
FIG. 3 depicts a flow chart showing operation of the system of FIGS. 1 and 2.

FIG. 3 depicts a flow chart showing operation of the system 200 of FIG. 2. In particular FIG. 3 shows a computer implemented method for managing processing of a plurality of trade related messages, or other types of messages depending upon the implementation. The operation includes: receiving, by a processor 202, a message, of the plurality of messages, which includes a plurality of quotes for at least one financial instrument (block 302); determining, by the processor 202 upon receipt of the message, a number of previously received messages of the plurality of messages for which processing has begun but not yet completed and further determining, by the processor, whether the number of previously received messages for which processing has begun but not yet completed plus the received message complies with a limit, either static or dynamic, of how many messages may be concurrently processed (block 304); and wherein, if it is determined that the number of previously received messages for which processing has begun but not yet completed plus the received message complies with the limit of how many messages may be concurrently processed, commencing processing by the processor 202 or a different processor of the received message (block 306), and if it is determined that the number of previously received messages for which processing has begun but not yet completed plus the received message does not comply with the limit of how many messages may be concurrently processed, not commencing processing by the processor of the received message (block 308).

In one embodiment, the plurality of messages and the limit are associated with a session, e.g. a logical and/or physical connection between one or more customer/entities and the exchange computer system 100, a gateway, a customer or a combination thereof.

In one embodiment, wherein the plurality of messages are received via a plurality of sessions, each of the plurality of sessions may be associated with a limit of how many messages may be concurrently processed.

In one embodiment, wherein the plurality of messages are received via a plurality of gateways, each of the plurality of gateways may be associated with a limit of how many messages may be concurrently processed.

In one embodiment, the limit of how many messages may be concurrently processed may be defined based on current or prior message processing capacity, e.g. overall capacity or that which is allocated/apportioned to the user, customer, session or gateway, capacity or load of a database, clearing function or other internal processing capacity or load, message processing load, available bandwidth of a communications medium over which the plurality of messages are received by the processor, throughput time to complete processing of a message once commenced, rate of message receipt by the processor, other historical metrics, or combinations thereof.

In one embodiment, a received message for which processing is not commenced is rejected. Alternatively, or in addition thereto, a received message for which processing is not commenced may stored in a memory 204 or buffer 210 coupled with the processor 202 to be processed when it is determined by the processor 202 that the number of previously received messages for which processing has not yet completed plus the stored received message complies with the limit of how many messages may be concurrently processed. In one embodiment, the memory 204 or buffer 210 may be characterized by a capacity and wherein, if the memory is at capacity, the received message may be rejected rather than stored. In one embodiment, if the number of queued messages increases to too high a level or at too high a rate, the session connection may be terminated resulting in a logout or other interruption of the connection between the market participant, i.e. their trading terminal/device and the trading system. It will be appreciated that a "session" describes a logical connection between the market participant and the trading system and may be defined by parameters such as an initiation, duration and termination. It will be further appreciated that the granularity of a session may be as small as a single message transmission, interaction, etc. The establishment of a session may create a relationship between the market participant, i.e. their trading terminal or device, and the trading system which endures as long as the session exists. This relationship may authorize the market participant to send messages, as described herein, to the trading system. When the session does not exist, e.g. the market participant has been logged out, they are unable to send messages to the trading system, i.e. any messages sent are automatically rejected or otherwise ignored.

In one embodiment, prior to the determining by the processor whether the number of previously received messages for which processing has begun but not yet completed plus the received message complies with a limit of how many messages may be concurrently processed, e.g. prior or subsequent to the receipt of a message, e.g. depending on whether newly received messages take precedence to or not over stored messages, the operation of the system 200 further includes determining, by the processor 202, whether the number of previously received messages for which processing has begun but not yet completed plus at least one of the stored received message complies with a limit of how many messages may be concurrently processed; and wherein if it is determined that the number of previously received messages for which processing has begun but not yet completed plus the at least one stored received message complies with the limit of how many messages may be concurrently processed, removing the at least one stored received message from the memory 204 or buffer 210 and commencing processing thereof by the processor 202.

In one embodiment, the operation of the system 200 further includes generating, or otherwise asserting, an indicator upon completion of processing of a message. The indicator may include a response message, e.g. transmitted to the sender, an acknowledgement, confirmation or other signal or flag or merely adjustment of the counter 212 as will be described.

In one embodiment, the operation of the system 200 further includes generating an indictor when processing of the received message is not commenced. In one embodiment, the indicator includes a response message indicating what happened, e.g. whether the message was queued or outright rejected.

In one embodiment, the operation of the system 200 further includes adjusting a counter 212 for each of the plurality of messages for which processing is commenced and for each of the plurality of messages for which processing is completed (block 310), wherein the determining further comprises comparing the counter 212 with the limit. In one embodiment wherein the counter 212 is initialized to zero, the adjusting further includes incrementing the counter 212 for each of the plurality of messages for which processing is commenced and decrementing the counter 212 for each of the plurality of messages for which processing is completed, the determining further comprising determining that the limit is not complied with when the counter 212, for example, equals the limit. Alternatively, wherein the counter 212 is initialized to equal the limit, the adjusting further comprising decrementing the counter 212 for each of the plurality of messages for which processing is commenced and incrementing the counter 212 for each of the plurality of messages for which processing is completed, the determining further comprising determining that the limit is not complied with when the counter 212, for example, is zero.

One skilled in the art will appreciate that one or more modules described herein may be implemented using, among other things, a tangible computer-readable medium comprising computer-executable instructions (e.g., executable software code). Alternatively, modules may be implemented as software code, firmware code, hardware, and/or a combination of the aforementioned. For example the modules may be embodied as part of an exchange 100 for financial instruments.

Figure 4:
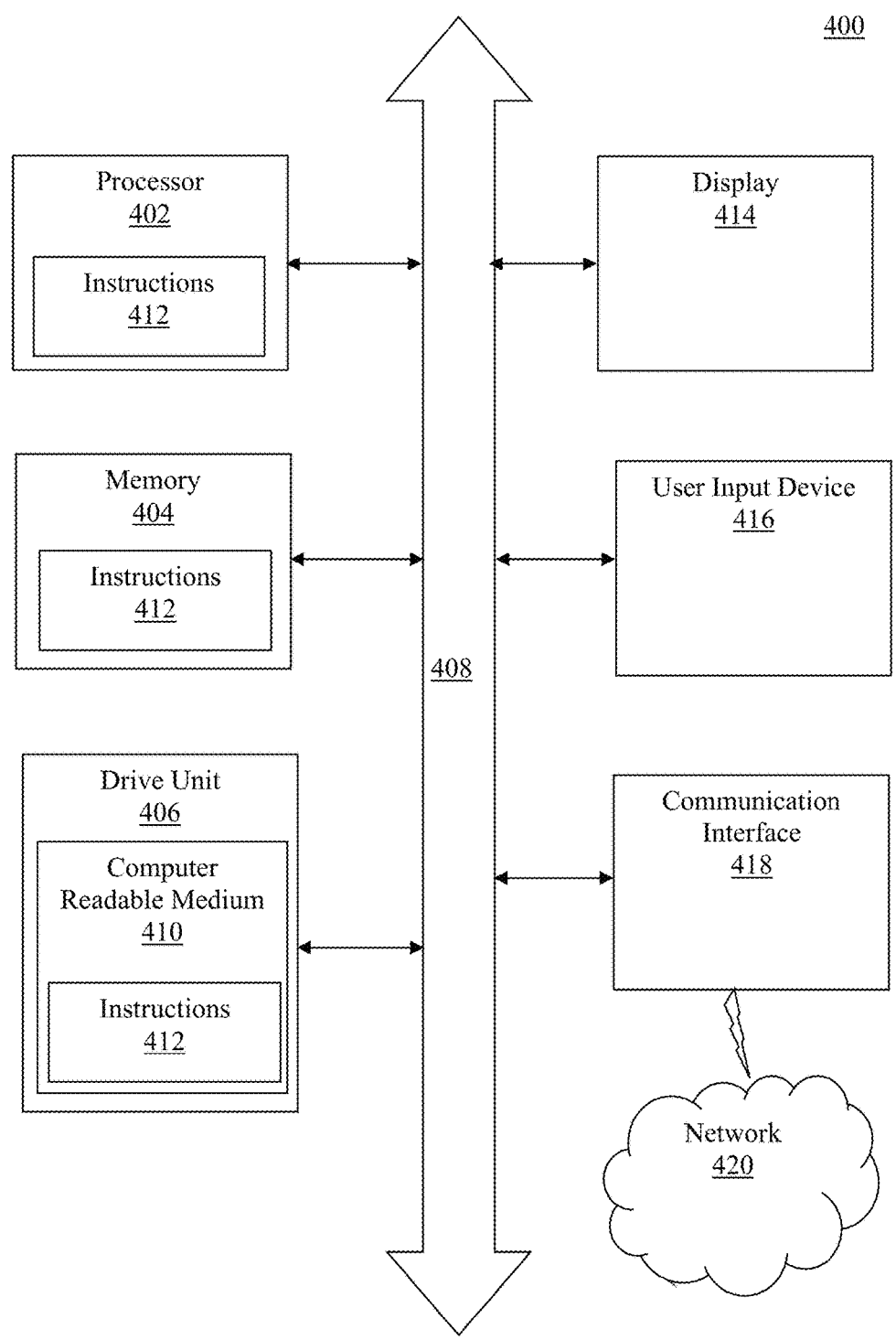
FIG. 4 shows an illustrative embodiment of a general computer system for use with the system of FIGS. 1 and 2.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above, such as the processor 202, may be a computer system 400 or a component in the computer system 400. The computer system 400 may implement a match engine, margin processing, payment or clearing function on behalf of an exchange, such as the Chicago Mercantile Exchange, of which the disclosed embodiments are a component thereof.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method comprising:
   receiving, by a processor, a message of a plurality of messages;
   determining, by the processor upon receipt of the message, a number of previously received messages of the plurality of messages for which processing has begun but not yet completed and further determining, by the processor, whether the number of previously received messages for which processing has begun but not yet completed is at a limit of how many messages are allowed to be concurrently processed; and
   wherein, if it is determined that the number of previously received messages for which processing has begun but not yet completed is not at the limit of how many messages are allowed to be concurrently processed, commencing processing by the processor of the received message, and if it is determined that the number of previously received messages for which processing has begun but not yet completed is at the limit of how many messages are allowed to be concurrently processed, not commencing processing by the processor of the received message; and
   further wherein the limit of how many messages are allowed to be concurrently processed is not more than a rate at which the processing of messages is completed.

2. The computer implemented method of claim 1 wherein the plurality of messages and the limit are associated with one of a plurality of sessions, one of a plurality of gateways, one of a plurality of customers, one of a plurality of message types or a combination thereof.

3. The computer implemented method of claim 2 wherein the limit is different from another limit associated with another of the plurality of sessions, another of the plurality of gateways, another of the plurality of customers, another of the plurality of message types or a combination thereof.

4. The computer implemented method of claim 3 wherein a sum of the limit and the other limit is not more than the rate at which the processing of messages is completed.

5. The computer implemented method of claim 1 wherein the limit of how many messages are allowed to be concurrently processed is defined based on current or prior message processing capacity, message processing load, available bandwidth of a communications medium over which the plurality of messages are received by the processor, throughput time to complete processing of a message once commenced, rate of message receipt by the processor, or combinations thereof.

6. The computer implemented method of claim 1 wherein the limit is static.

7. The computer implemented method of claim 1 wherein the limit is dynamic.

8. The computer implemented method of claim 1 wherein a received message for which processing is not commenced is rejected.

9. The computer implemented method of claim 1 wherein a received message for which processing is not commenced is stored in a memory coupled with the processor to be processed when it is determined by the processor that the number of previously received messages for which processing has not yet completed is not at the limit of how many messages are allowed to be concurrently processed.

10. The computer implemented method of claim 9 wherein the memory is characterized by a capacity and wherein, if the memory is at capacity, the received message is rejected rather than stored.

11. The computer implemented method of claim 9 further comprising:
prior to the determining by the processor upon receipt of the message whether the number of previously received messages for which processing has begun but not yet completed is at a limit of how many messages are allowed to be concurrently processed, determining, by the processor, whether the number of previously received messages for which processing has begun but not yet completed is at a limit of how many messages are allowed to be concurrently processed; and
wherein, prior to the receipt of the message, if it is determined that the number of previously received messages for which processing has begun but not yet completed is not at the limit of how many messages are allowed to be concurrently processed, removing the at least one stored received message and commencing processing thereof by the processor.

12. The computer implemented method of claim 1 further comprising, subsequent to a determination that the number of previously received messages for which processing has begun but not yet completed is at the limit of how many messages are allowed to be concurrently processed and further subsequent to a determination that the number of previously received messages for which processing has begun but not yet completed is not at the limit of how many messages are allowed to be concurrently processed, determining, by the processor upon receipt of the message, a number of previously received messages of the plurality of messages for which processing has begun but not yet completed and further determining, by the processor, whether the number of previously received messages for which processing has begun but not yet completed is at another limit, less than the limit, of how many messages are allowed to be concurrently processed; and
wherein, if it is determined that the number of previously received messages for which processing has begun but not yet completed is not at the other limit of how many messages are allowed to be concurrently processed, commencing processing by the processor of the received message, and if it is determined that the number of previously received messages for which processing has begun but not yet completed is at the other limit of how many messages are allowed to be concurrently processed, not commencing processing by the processor of the received message.

13. The computer implemented method of claim 12 wherein the limit comprise a high watermark and the other limit comprises a low watermark.

14. The computer implemented method of claim 12 wherein the other limit differs from the limit so as to delay commencement of the processing of received messages subsequent to the limit being reached.

15. The computer implemented method of claim 1 further comprising adjusting a counter for each of the plurality of messages for which processing is commenced and for each of the plurality of messages for which processing is completed, wherein the determining further comprises comparing the counter with the limit.

16. The computer implemented method of claim 15 wherein the counter is initialized to zero, the adjusting further comprising incrementing the counter for each of the plurality of messages for which processing is commenced and decrementing the counter for each of the plurality of messages for which processing is completed, the determining further comprising determining that the number of previously received messages for which processing has begun but not yet completed is at the limit when the counter equals the limit.

17. The computer implemented method of claim 15 wherein the counter is initialized to equal the limit, the adjusting further comprising decrementing the counter for each of the plurality of messages for which processing is commenced and incrementing the counter for each of the plurality of messages for which processing is completed, the determining further comprising determining that the number of previously received messages for which processing has begun but not yet completed is at the limit when the counter is zero.

18. The computer implemented method of claim 1 wherein the maximum rate of commencing of message processing is limited by a rate at which processing of messages is completed.

19. A system comprising:
first logic stored in the memory and executable by the processor to cause the processor to receive a message of a plurality of messages;
second logic stored in the memory and executable by the processor to cause the processor to determine, upon receipt of the message, a number of previously received messages of the plurality of messages for which processing has begun but not yet completed and further determine whether the number of previously received messages for which processing has begun but not yet completed is at a limit of how many messages are allowed to be concurrently processed; and wherein, if it is determined that the number of previously received messages for which processing has begun but not yet completed is not at the limit of how many messages are allowed to be concurrently processed, the second logic is further operative to commence processing of the received message, and if it is determined that the number of previously received messages for which processing has begun but not yet completed is at the limit of how many messages are allowed to be concurrently processed, the second logic is further operative to not commence processing of the received message; and further wherein the limit of how many messages are allowed to be concurrently processed is not more than a rate at which the processing of messages is completed.

20. The system of claim 19 wherein the plurality of messages and the limit are associated with one of a plurality of sessions, one of a plurality of gateways, one of a plurality of customers, one of a plurality of message types or a combination thereof.

21. The system of claim 20 wherein the limit is different from another limit associated with another of the plurality of sessions, another of the plurality of gateways, another of the plurality of customers, another of the plurality of message types or a combination thereof.

22. The system of claim 21 wherein a sum of the limit and the other limit is not more than the rate at which the processing of messages is completed.

23. The system of claim 19 wherein the limit of how many messages are allowed to be concurrently processed is defined based on current or prior message processing capacity, message processing load, available bandwidth of a communications medium over which the plurality of messages are received by the processor, throughput time to complete processing of a message once commenced, rate of message receipt by the processor, or combinations thereof.

24. The system of claim 19 wherein the limit is static.

25. The system of claim 19 wherein the limit is dynamic.

26. The system of claim 19 wherein the second logic is further executable by the processor to cause the processor to reject a received message for which processing is not commenced.

27. The system of claim 19 wherein the second logic is further executable by the processor to cause the processor store in the memory a received message for which processing is not commenced to be processed when it is determined that the number of previously received messages for which processing has not yet completed is not at the limit of how many messages are allowed to be concurrently processed.

28. The system of claim 27 wherein the memory is characterized by a capacity and wherein, if the memory is at capacity, the received message is rejected rather than stored.

29. The system of claim 27 further comprising:
prior to the determination upon receipt of the message whether the number of previously received messages for which processing has begun but not yet completed is at a limit of how many messages are allowed to be concurrently processed, the second logic is further executable by the processor to cause the processor to determine whether the number of previously received messages for which processing has begun but not yet completed is at a limit of how many messages are allowed to be concurrently processed; and
wherein, prior to receipt of the message, if it is determined that the number of previously received messages for which processing has begun but not yet completed is not at the limit of how many messages are allowed to be concurrently processed, the second logic is further executable by the processor to cause the processor to remove the at least one stored received message from the memory and commence processing thereof.

30. The system of claim 19 wherein the second logic is further executable by the processor to cause the processor to, subsequent to a determination that the number of previously received messages for which processing has begun but not yet completed is at the limit of how many messages are allowed to be concurrently processed and further subsequent to a determination that the number of previously received messages for which processing has begun but not yet completed is not at the limit of how many messages are allowed to be concurrently processed, determine upon receipt of the message, a number of previously received messages of the plurality of messages for which processing has begun but not yet completed and further determine whether the number of previously received messages for which processing has begun but not yet completed is at another limit, less than the limit, of how many messages are allowed to be concurrently processed; and
wherein, if it is determined that the number of previously received messages for which processing has begun but not yet completed is not at the other limit of how many messages are allowed to be concurrently processed, the second logic is further operative to commence processing of the received message, and if it is determined that the number of previously received messages for which processing has begun but not yet completed is at the other limit of how many messages are allowed to be concurrently processed, the second logic is further operative to not commence processing of the received message.

31. The system of claim 30 wherein the limit comprise a high watermark and the other limit comprises a low watermark.

32. The system of claim 30 wherein the other limit differs from the limit so as to delay commencement of the processing of received messages subsequent to the limit being reached.

33. The system of claim 19 wherein the second logic is further executable by the processor to cause the processor to adjust a counter for each of the plurality of messages for which processing is commenced and for each of the plurality of messages for which processing is completed, wherein the second logic is further executable by the processor to cause the processor to compare the counter with the limit.

34. The system of claim 33 wherein the counter is initialized to zero, the second logic being further executable by the processor to cause the processor to increment the counter for each of the plurality of messages for which processing is commenced and decrement the counter for each of the plurality of messages for which processing is completed, the second logic being further executable by the processor to determine that the number of previously received messages for which processing has begun but not yet completed is at the limit when the counter equals the limit.

35. The system of claim 33 wherein the counter is initialized to equal the limit, the second logic being further executable by the processor to cause the processor to decrement the counter for each of the plurality of messages for which processing is commenced and increment the counter for each of the plurality of messages for which processing is completed, the second logic being further executable by the processor to determine that the number of previously received messages for which processing has begun but not yet completed is at the limit when the counter is zero.

36. The system of claim 19 wherein the maximum rate of commencement of message processing is limited by a rate at which message processing is completed.

37. A system comprising:
  means for receiving a message of a plurality of messages;
  means for determining upon receipt of the message, a number of previously received messages of the plurality of messages for which processing has begun but not yet completed and further determining whether the number of previously received messages for which processing has begun but not yet completed is at a limit of how many messages are allowed to be concurrently processed; and
  wherein, if it is determined that the number of previously received messages for which processing has begun but not yet completed is not at the limit of how many messages are allowed to be concurrently processed, the means for determining being further to commence processing of the received message, and if it is determined that the number of previously received messages for which processing has begun but not yet completed is at the limit of how many messages are allowed to be concurrently processed, the means for determining being further operative to not commencing processing of the received message; and
  further wherein the limit of how many messages are allowed to be concurrently processed is not more than a rate at which the processing of messages is completed.

* * * * *